(12) United States Patent
Delker et al.

(10) Patent No.: US 8,036,690 B1
(45) Date of Patent: Oct. 11, 2011

(54) DOWNLOAD PRIORITIZATION FOR INTELLIGENT CONTENT DISTRIBUTION

(75) Inventors: Jason R. Delker, Olathe, KS (US); Robin D. Katzer, Olathe, KS (US); Todd N. Koellner, Overland Park, KS (US); Brian D. Mauer, Shawnee, KS (US); Sei Y. Ng, Olathe, KS (US); M. Jeffrey Stone, Overland Park, KS (US)

(73) Assignee: Sprint Communciations Company L.P., Overland Park, KS (US)

( * ) Notice: Subject to any disclaimer, the term of this patent is extended or adjusted under 35 U.S.C. 154(b) by 720 days.

(21) Appl. No.: 12/133,351

(22) Filed: Jun. 4, 2008

(51) Int. Cl.
*H04B 7/00* (2006.01)

(52) U.S. Cl. ........ 455/512; 455/513; 455/453; 455/134; 455/115.3; 725/46; 725/37; 709/217

(58) Field of Classification Search ............... 455/512, 455/3.06, 3.01, 3.03, 3.04, 412.1, 414.1, 455/414.3, 464, 13.4, 522, 574, 115.3, 134, 455/177.1; 370/328, 338, 389, 401, 419, 370/452, 453, 462, 450; 725/35, 37, 46, 725/135; 709/217
See application file for complete search history.

(56) References Cited

U.S. PATENT DOCUMENTS

| | | | |
|---|---|---|---|
| 6,895,005 B1 * | 5/2005 | Malin et al. ............ | 370/389 |
| 7,194,551 B1 | 3/2007 | Moll et al. | |
| 7,206,593 B1 | 4/2007 | Yarkosky et al. | |
| 7,499,468 B2 * | 3/2009 | Montgomery, Jr. ......... | 370/453 |
| 2002/0147979 A1 * | 10/2002 | Corson ................... | 725/90 |
| 2003/0073435 A1 * | 4/2003 | Thompson et al. ......... | 455/428 |
| 2005/0042983 A1 * | 2/2005 | Borgward ............... | 455/3.06 |
| 2006/0015904 A1 * | 1/2006 | Marcus .................. | 725/46 |
| 2006/0161635 A1 * | 7/2006 | Lamkin et al. ............ | 709/217 |
| 2010/0275040 A1 | 10/2010 | Ginter et al. | |
| 2010/0275272 A1 | 10/2010 | Risan et al. | |
| 2010/0281364 A1 | 11/2010 | Sidman | |
| 2010/0281544 A1 | 11/2010 | Risan et al. | |
| 2010/0287461 A1 | 11/2010 | Paila et al. | |
| 2010/0293221 A1 | 11/2010 | Sidman et al. | |
| 2010/0299274 A1 | 11/2010 | Rappaport | |
| 2010/0301112 A1 | 12/2010 | Lapstun et al. | |

OTHER PUBLICATIONS

Delker, Jason R., et al., Patent Application entitled, "Right-Sized Content Distribution," filed on May 21, 2008, U.S. Appl. No. 12/124,885. Office Action dated Dec. 16, 2010, U.S. Appl. No. 12/124,885, filed May 21, 2008.
Notice of Allowance dated May 25, 2011, U.S. Appl. No. 12/124,885, filed on May 21, 2008.
Supplemental Notice of Allowance dated Jun. 29, 2011, U.S. Appl. No. 12/124,885, filed on May 21, 2008.

* cited by examiner

*Primary Examiner* — Tan Trinh

(57) ABSTRACT

Systems and methods for transmitting multimedia data are disclosed which, in some embodiments, may comprise polling a first wireless device to obtain at least a first statistics of consumption of content previously transmitted to the first wireless device and polling a second wireless device to obtain at least a second statistics of consumption of content previously transmitted to the second wireless device. The method also comprises determining the resources available to transmit a first content and a second content to the first and second wireless device, wherein the first content to be transmitted to the first wireless device is selected based on the first statistics of consumption, and wherein the second content to be transmitted to the second wireless device is selected based on the second statistics of consumption. The method also comprises creating a priority list based on the first statistics of consumption and the second statistics of consumption, wherein the priority list comprises the first wireless device and the first content and the second wireless device and the second content and transmitting the first content to the first wireless device and the second content to the second wireless device according to the priority list and according to the resources available.

20 Claims, 10 Drawing Sheets

DOWNLOAD PRIORITIZATION FOR INTELLIGENT CONTENT DISTRIBUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless networks permit the conveyance of multimedia content to wireless users. This content may include information that is delivered to an end user in the form of audio, video, and other content of interest to a wireless user. This content allows a wireless user to obtain information delivered directly to the wireless user while the wireless user is mobile.

While multimedia content offers rich content to a user, this content must be delivered to a wireless user. Several constraints may exist in a network that limit the amount of content that may be delivered to a wireless user including the available bandwidth provided by a local wireless base transceiver station, the number of concurrent users in the area, and interference that may be present.

SUMMARY

In an embodiment, a method for transmitting multimedia data is provided that comprises polling a first wireless device to obtain at least a first statistics of consumption of content previously transmitted to the first wireless device and polling a second wireless device to obtain at least a second statistics of consumption of content previously transmitted to the second wireless device. The method also comprises determining the resources available to transmit a first content and a second content to the first and second wireless device, wherein the first content to be transmitted to the first wireless device is selected based on the first statistics of consumption, and wherein the second content to be transmitted to the second wireless device is selected based on the second statistics of consumption. The method also comprises creating a priority list based on the first statistics of consumption and the second statistics of consumption, wherein the priority list comprises the first wireless device and the first content and the second wireless device and the second content and transmitting the first content to the first wireless device and the second content to the second wireless device according to the priority list and according to the resources available.

In another embodiment, a system for prioritizing the transmission of wireless data is provided. The system comprises a data server content component, a transmission component, a network statistic component, and a network prioritization component. The data server content component receives content. The transmission component transmits the content to at least one wireless device. The network statistic component determines the current status of the network including a number of wireless devices in the coverage area of the transmission component and an available bandwidth. The network prioritization component polls the at least one wireless device to determine a history of usage of a previously transmitted content and to determine a current power status of the wireless device. When the current power status of the at least one wireless device is at least one of connected to external power or battery power reserve above a predefined threshold, the network prioritization component promotes transmission of the content by the transmission component.

In yet another embodiment, a method of transmitting data to a wireless device is provided. The method comprises determining a plurality of non-peak traffic times for a wireless network and transmitting a first message to a wireless device over the wireless network during one of the non-peak traffic times. The method also comprises a wireless device transmitting statistics about playback of previously downloaded content on the wireless device, where the transmitting is in response to the message transmitted to the wireless device. The method also comprises preparing a package of content selected for the wireless device based on the statistics and transmitting a second message to the wireless device at a time selected based on a prioritization of content distribution to a plurality of wireless devices. The method also comprises the wireless device requesting transmission of the package of content to the wireless device, where the requesting is in response to the second message transmitted to the wireless device.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
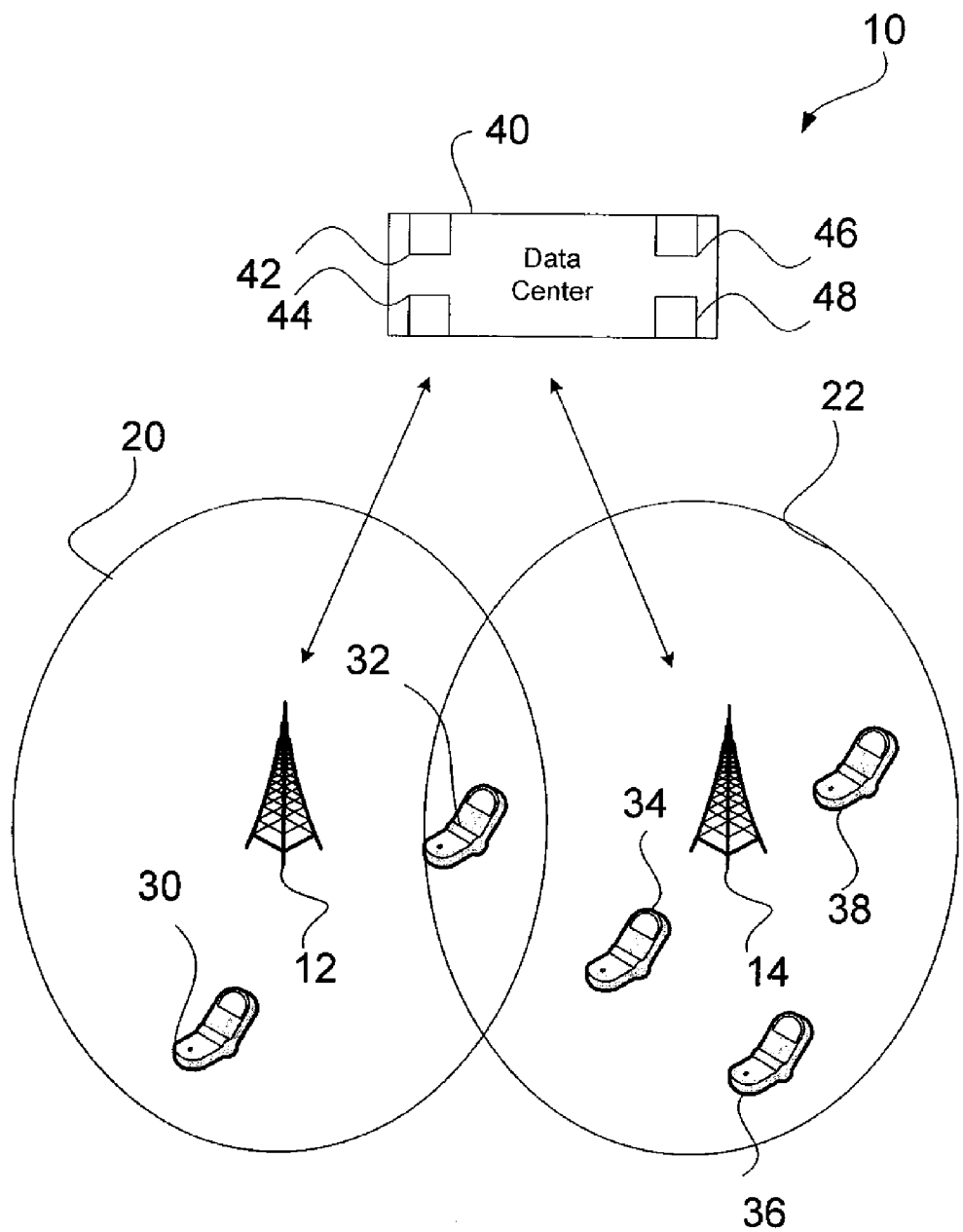
FIG. 1 illustrates a system for implementing a download prioritization system for intelligent content distribution according to an embodiment of the disclosure.

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Modern wireless devices have the ability to receive and display rich multimedia content. This content may include news, entertainment, or other multimedia content of interest to a user. However, wireless networks have the ability to transmit a finite amount of information to wireless users. There are many constraints that limit the amount of information, and therefore content, that the wireless network can carry, including, but not limited to, the bandwidth of the data center, the bandwidth of the cell towers, the range of the cell towers, and the bandwidth connecting the cell towers to the data center.

Traditional systems allow a wireless device to contact and request content from a data center. However, these systems have difficulty handling peak traffic because the request for content during peak times may exceed one or more of the bandwidth constraints contained within the data network. Systems and methods that could compensate for the bandwidth constraints of the data network while still providing content to users would be desirable. One method of partially compensating for the bandwidth limitations inherent within the data network is caching content on wireless devices before content is requested. This caching allows for content to be transmitted to the wireless device based upon user preferences and/or subscriptions, anticipated requests by a user, or any other disclosed mechanism. By transmitting content to a wireless device during periods of low use and, in some embodiments, over a longer time interval, the problem of satisfying peak loads of content demand which may exceed the throughput capacity of the network may be at least partially solved. This transmission of content to a plurality of wireless devices may be performed in a prioritized order based upon the user preferences, content requested, expected time of playback, or other factors disclosed herein during periods when bandwidth is available to the network. By transmitting content to a plurality of wireless devices in a prioritized order during periods when bandwidth is available to the network, content may be efficiently distributed to a plurality of wireless devices. Related details about determining how much content to distribute may be described in U.S. patent application Ser. No. 12/124,885 filed May 21, 2008, entitled "Right-sized Content Distribution" by Jason R. Delker et al., which is hereby incorporated by reference for all purposes.

The prioritized transmission of content to the wireless devices may be based on a number of factors. The wireless device may be awakened by the network or by a data center or other server that communicates with the wireless device via the network, for example a wireless network or a radio access network, to trigger the wireless device to transmit information to the data center or other server. In some contexts, this awakening of the wireless device to cause it to transmit information may be referred to as polling the wireless device. The wireless device may first transmit a history of consumption or playback of content cached on the wireless device to the data center or other server. The history may include information about when the cached content was consumed by a user of the wireless device, how much of the cached content was consumed, and what segments or portions of the cached content was skipped. In some contexts, the history of consumption or playback of content may also be referred to as statistics of consumption of content previously transmitted. Additional contextual information associated with the consumption and/or playback of the content may also be transmitted, for example a plurality of locations of the wireless device when the content was consumed.

The data center and/or other server may analyze the history of consumption and contextual information to determine how much content and what kind of content to send to the wireless device. Additionally, the data center and/or other server may infer a playback time, for example the start of a work commute of a user of the wireless device, based on the information history as well as the contextual information. The data center and/or other server may then assemble context, possibly containing different segments corresponding to different types of news stories, for prioritized downloading to the wireless device. The data center and/or other server transmits the content to the wireless device based on prioritizing the order of downloads to a plurality of wireless devices during an off-peak time interval, for example a time extending from about 2 AM to about 5 AM local time, or some other effective time interval corresponding to an off-peak time interval. In some circumstances, there may be multiple off-peak time intervals in one day. Additionally, off-peak time intervals may be different between week days and weekend days and holidays. The prioritization may be based on a number of factors including a customary time when content consumption begins for each of the plurality of wireless devices, a current stored power level of each of the wireless devices, the current signal strength of the link between the wireless devices and the serving base transceiver station or other access node, and other factors.

In an embodiment, during the first exchange between the wireless device and the data center and/or other server, before uploading the history of content consumption and contextual information, the wireless device may transmit its power management state. If the wireless device is coupled to external power, for example a charger device, or if the wireless device battery has more than a threshold of energy reserve, the data center and/or other server, may push or otherwise trigger the wireless device to upload the history of content consumption and the contextual information and, later, to download the selected content to the wireless device in the appropriate prioritized order. On the other hand, if the wireless device is not coupled to external power and is operating on battery power with less than the threshold of energy reserve, the data center and/or the other server will forgo pushing or triggering the upload of history and context information and forgo the downloading of the selected content to the wireless device in the prioritized order, whereby to not deplete the already low battery power reserve of the wireless device. In some cases, a wireless device experiencing a low battery energy reserve may be triggered to upload history and context information but no selected content will be downloaded. In some circumstances, the battery power reserve and the communication bandwidth available for the upload are considered jointly. For example, if only a low bandwidth channel is available for the content download, the duration of the selected content may continue for such an extended period of time that the battery would be undesirably depleted. Various circumstances can be associated with a low bandwidth channel. A low signal strength between a wireless device and a base transceiver station may lead to the selection of a low modulation rate for the radio communications, for example modulation based on a smaller quadrature amplitude modulation (QAM) constellation, for example selection of a 16-QAM versus a 64-QAM constellation. Specific different technologies used for data transmission may be associated with low bandwidth, for example CDMA2000 1xRTT may provide a lower bandwidth channel than the channel provided by CDMA2000 1 xEV-DO.

FIG. 1 is an example of a data network 10 that could be used consistent with embodiments disclosed herein. In this example embodiment, a first base transceiver station 12 with a first wireless coverage area 20 and a second base transceiver station 14 with a second wireless coverage area 22 are used to deliver information to a plurality of wireless devices. A wireless device 30 is within the coverage area of the first base transceiver station 12. A second wireless device 32 is within the coverage area of the first base transceiver station 12 and the second base transceiver station 14. A third wireless device 34, a fourth wireless device 36, and a fifth wireless device 38 are within the coverage area of the second base transceiver station 14. It is understood that in the example shown in FIG. 1, each of the wireless devices 30, 32, 34, 36 and 38 may communicate with any base transceiver station that the particular wireless device is within the range of. FIG. 1 further illustrates that the first base transceiver station 12 and the second base transceiver station 14 are in communication with a data center 40.

Wireless devices 30, 32, 34, 36 and 38 are intended to be illustrative wireless devices. For the purpose of clarity, the wireless device 30 will be discussed throughout this specification as a representative example of the wireless devices 30, 32, 34, 36 and 38. However, it is explicitly understood that there may be heterogeneous or homogenous groups of wireless device within the disclosed system 10. The wireless device 30 is intended to refer to any device capable of receiving a wireless data signal, including, but not limited to, a mobile telephone, a personal digital assistant (PDA), a media player, or a mobile computer equipped with a wireless interface. It is expressly understood that any device can be the wireless device 30 so long as it is equipped with the ability to send and receive wireless information from the first base transceiver station 12 or the second base transceiver station 14.

The data center 40 is intended to refer to one or more general purpose computers capable of transmitting content from a source to a destination. General purpose computers are discussed in more detail hereinafter. Examples of data centers 40 include, but are not limited to computer data centers that store content for use by the wireless device 30. Data centers 40 may be in communication with any number of content sources, including internet sources, as known by one skilled in the art. Within the data center 40 a data server content component 42, a transmission component 44, a network statistic component 46, and a network prioritization component 48 are shown. The data server content component 42, the transmission component 44, the network statistic component 46, and the network prioritization component 48 may be implemented as hardware, software, or a combination thereof. Moreover, one or more of the components illustrated as part of the data center 40, in some embodiments, may be integrated with elements of one or more base transceiver stations. For instance, the transmission component 44, in some embodiments, may be integrated into the first base transceiver station 12. Combined with this disclosure, the implementation of one or more of the components may be preformed as known to one skilled in the art.

The data server content component 42 receives content for use by at least one user. This content may be transmitted to the data center 40 from any source, including, but not limited to, content transmitted over the internet. The transmission component 44 transmits the content to at least one wireless device.

The transmission component 44 may transmit content through a plurality of base transceiver stations 12, 14. The network statistic component 46 determines the current status of the data network 10, including the number of wireless devices sharing the transmission component 44, the number of wireless devices sharing the plurality of base transceiver stations 12, 14 and the available bandwidth component. For purposes of the present disclosure, available bandwidth may refer to either current bandwidth not consumed by in-progress communications, or a reserved bandwidth not allocated for the intelligent content delivery service. The network statistic component 46 may make this determination based on data obtained by a plurality of base transceiver stations 12, 14. The network prioritization component 48 accepts requests by a plurality of wireless devices 30, 32, 34, 36, 38 for content and orders and/or sequences the transmission of the content to the plurality of wireless devices.

In the embodiment illustrated in FIG. 1, one or more of the wireless devices 30, 32, 34, 36, 38 may be subscribed to one or more sources of content. These sources of content may be any sources of content, including, but not limited to news, entertainment, sports, or other content. The content may comprise audio content, text content, video content, multimedia content, and other content. Each of these content sources may deliver content to the wireless device 30 in forms including, but not limited to, text, video, audio, multimedia, or audio and video. One of the problems in delivering this content is that on-demand bandwidth (e.g. the bandwidth available to the wireless device 30 at any given time) may be insufficient during peak usage time to allow for content to be transferred to the wireless device from the base transceiver station or the data center. For example users of the wireless devices 30, 32, 34, 36, and 38 may wish to consume the content during their commute to work during rush hour. The network may not be engineered to provide the throughput capacity to satisfy this peak hour demand in real-time.

If the demanded throughput overloads the network 10, network interruption, poor content quality, or content delivery failure may occur. The present disclosure contemplates numerous systems and methods which compensate for limited throughput capacity. It is expressly understood that these systems and methods may be used simultaneously, or any individual system or method disclosed herein may be used without the need to implement all of the disclosed systems and methods.

In one embodiment, content is delivered to the wireless devices (e.g. the wireless devices 30, 32, 34, 36 and 38) at different times. By reducing the number of the wireless devices 30, 32, 34, 36, 38 simultaneously requesting content, the amount of overall required bandwidth may be decreased. Disclosed herein are several systems and methods to reduce the total number of the wireless devices 30, 32, 34, 36, 38 simultaneously requesting content. In some of these systems and methods, a process called 'pre-loading' is used. Pre-loading is intended to include, but not be limited to, a process by which content is provided to the wireless device 30 prior to a request for viewing of content on the wireless device 30.

In some embodiments, pre-loading is performed prior to the wireless device 30 requesting to use the content. The selection of content to be pre-loaded may be performed in various ways. For example, the content may be pre-loaded based on the explicit request of the wireless device 30, for example by subscription to specific content. Alternatively, the content may be pre-loaded based on a usage history of the wireless device 30 (e.g. a user reads the same newspaper every morning). The data center 40, or some component within the data center 40, may have access to the usage history of the wireless device 30, or the wireless device 30 can be trained to anticipate the user's habits by tracking the user's prior history. In other embodiments, other processes for selecting the content to be pre-loaded may be employed.

For example, in an embodiment, the data center 40 may transmit a first message to the wireless device 30 via the first base transceiver station 12. In some contexts, this may be referred to as the data center 40 pushing the first message to the wireless device 30. This first message may cause the wireless device 30 to awaken from a dormant state that may have been entered after a time out period of non-use to conserve battery power. In response to the first message, the wireless device 30 transmits statistics about consumption of the content that was provided to the wireless device 30 the day before, for example information about playback of the previous content. The wireless device 30 may also transmit other information including a current battery power reserve and a connected/unconnected to external power status.

The data center 40 may analyze the statistics to determine an appropriate selection of content to accumulate into a content package. The content package may be appropriately sized for the amount of content played back by the wireless device 30. The data center 40 transmits a second message to the wireless device 30 at a time which is appropriate for the wireless device 30 to receive the content package, for example at a time suitable to a prioritized order of transmission of a plurality of independent content packages to other wireless devices. In some contexts, this may be referred to as the data center 40 pushing the second message to the wireless device 30. The second message may cause the wireless device 30 to awaken from a dormant state. The wireless device 30 then requests the transmission of the content package from the data center 40 to the wireless device 30, under control of the wireless device 30. In some contexts, this may be referred to as the wireless device 30 pulling the content package from the data center 40. In the case that the battery state of the wireless device 30 is indicated to be below a first predefined threshold and the wireless device is not connected to external power, for example to a battery charger, the data center 40 will not send the second message. In the case that the battery state is above the first threshold but below a second threshold and the available communication bandwidth between the wireless device 30 and the first base transceiver station 12 is below a third threshold, implying the transmission of the content package would take a long period of time and hence deplete the battery of the wireless device 30 excessively, the data center 40 will not send the second message.

Figure 2:
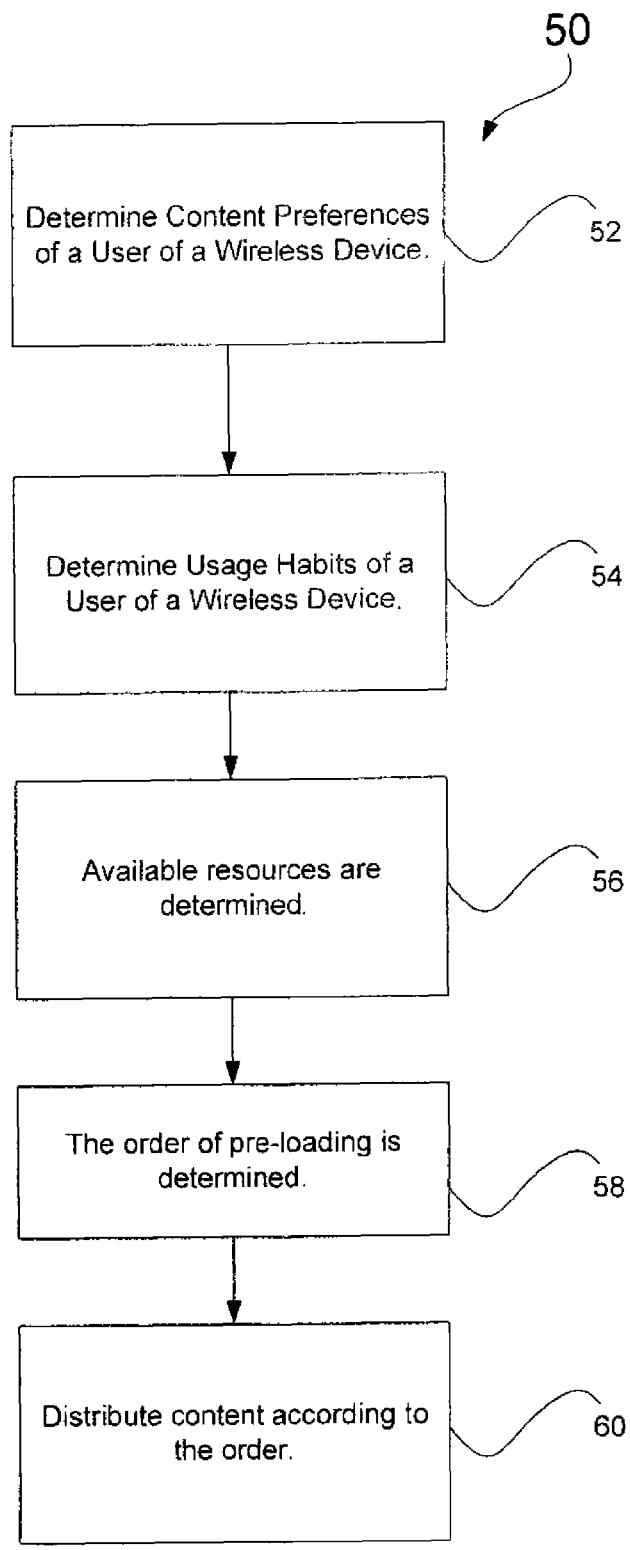
FIG. 2 illustrates a method according to an embodiment of the disclosure.

FIG. 2 is a flowchart of a method 50 of intelligent content distribution. In block 52 the data network 10 determines the content preferences of a user associated with the wireless device 30. As discussed above, these content preferences may be determined through any number of methods including, but not limited to, the explicit requests of the user, the usage pattern of the user, the anticipated pattern of users, advertisement that may be directed to a user, or any other preference known to one skilled in the art. The content preferences of the user may be determined by the wireless devices 30, 32, 34, 36, 38 being subscribed to receive specific types of content. In block 54, the data network 10 determines the usage habits of the associated user of the wireless device 30. These usage habits include the amount of data that is transferred in delivering the content determined in block 52 and the location of the wireless device 30 at different times. In block 56, the available wireless resources are determined. These resources include, but are not limited to, the available bandwidth, the available content, and other network considerations known by one skilled in the art. It is expressly understood that the available bandwidth may, in some embodiments, be a function related to a percentage of the available bandwidth. In block 58 an order of pre-loading is determined. The order of pre-loading, in some embodiments, may be determined based upon the usage habits of the user associated with the wireless device 30, the available wireless resources, or another metric (e.g. wireless service plan the wireless user has subscribed to, type of content, etc.). The order of the pre-loading is intended to refer to the order in which data is transmitted to the wireless devices 30, 32, 34, 36, and 38. In block 60, the content is delivered.

The order of the pre-loading promotes content being delivered to the wireless devices 30, 32, 34, 36, and 38 prior to the content to being requested and/or used. For instance, the delivery of content to a commuter who uses a weather report early in the morning may be prioritized over or scheduled ahead of the delivery of content to a different user who uses a weather report late in the afternoon. The ordering of the distribution of content, and consequently the priority of the user in content distribution, may be based upon the time of content use and the type of content being used. It is further explicitly understood that the order of pre-loading may be performed for any reason, including, but not limited to, the specific content being requested (e.g. emergency information may have higher priority than non-emergency information, a subscriber may pay a premium for exclusive content and higher priority delivery, etc.).

In an embodiment, the data center 40 may poll the wireless device 30 to obtain a first set of statistics about playback or consumption of content that had been transmitted previously, for example the day before, to the wireless device 30. As part of the polling exchange or dialog, the wireless device 30 provides statistics or information about the playback of consumption of the content, for example when the content was played, how much of the content was played, what portion of the content was not played. Additionally, other contextual information may be provided, including a plurality of locations of the wireless device 30 during the playback. The data center 40 may also poll the second wireless device 32 to obtain a second set of statistics about playback or consumption of the content that had been transmitted previously to the second wireless device 32.

The data center 40 may determine the resources available to transmit a first content and a second content, for example a first content package and a second package content, to the wireless device 30 and the second wireless device 32, respectively. The first content package is selected and composed based on the statistics transmitted by the wireless device 30. Similarly, the second content package is selected and composed based on the statistics transmitted by the second wireless device 32. The data center 40 may create a priority list based on the first and the second statistics that identifies a preferred order for transmitting the content packages to the wireless device 30 and the second wireless device 32. The data center 40 then transmits the content packages to the wireless device 30 and the second wireless device 32 in the priority order, for example via the base transceiver station 12, 14. While in this simple example, only two wireless devices 30, 32 are discussed, in practice it may be expected that there may be many more wireless devices that the data center 40 transmits selected content packages to in a prioritized order.

Figure 3:
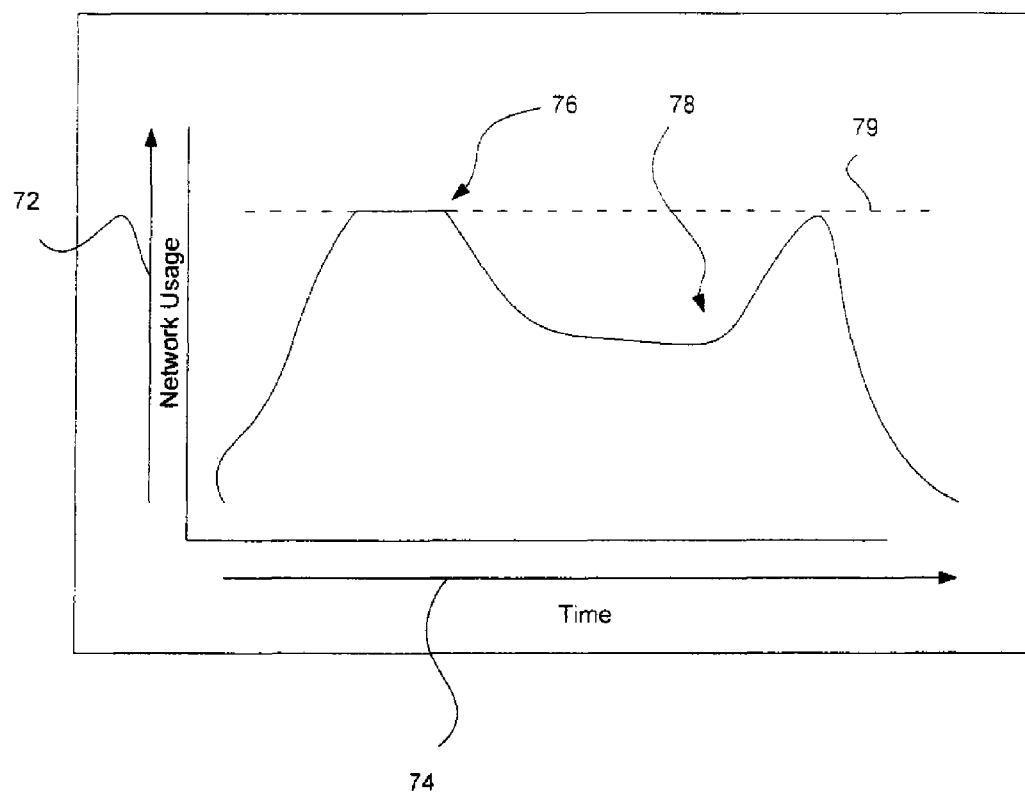
FIG. 3 illustrates a graph of wireless system usage according to an embodiment of the disclosure.

One of the factors that affects the available bandwidth is the network utilization. In some embodiments, network utilization generally may refer to the percentage of the network bandwidth that is currently in use. During peak traffic times, network utilization is generally higher than during non-peak traffic times. FIG. 3 is a graph of the network utilization at different times. In this embodiment, the y-axis represents network utilization 72 and the x-axis represents time 74. The graph that is shown illustrates that a peak time 76 is shown with a non-peak time 78. During peak times 76, such as commute times, the available network resources are significantly lower than during non-peak times 78, such as late at night. For purposes of illustration, the peak time 76 consumes all available bandwidth—for example, demanded traffic may exceed or equal offered traffic. Therefore, during non-peak times 78 multimedia content may be transmitted to the wireless devices 30, 32, 34, 36, and 38 without degrading network quality. The peak times 76 and non-peak times 78 can be identified by any method known to one skilled in the art, including, but not limited to, tracking prior usage of the network. If the peak time 76 exceeds the maximum network throughput line 79, network transmission problems may occur. By identifying the non-peak network times 78, downloads and pre-loading may be scheduled for times where there is not peak usage of the network, thereby promoting efficient use of the network.

Figure 4:
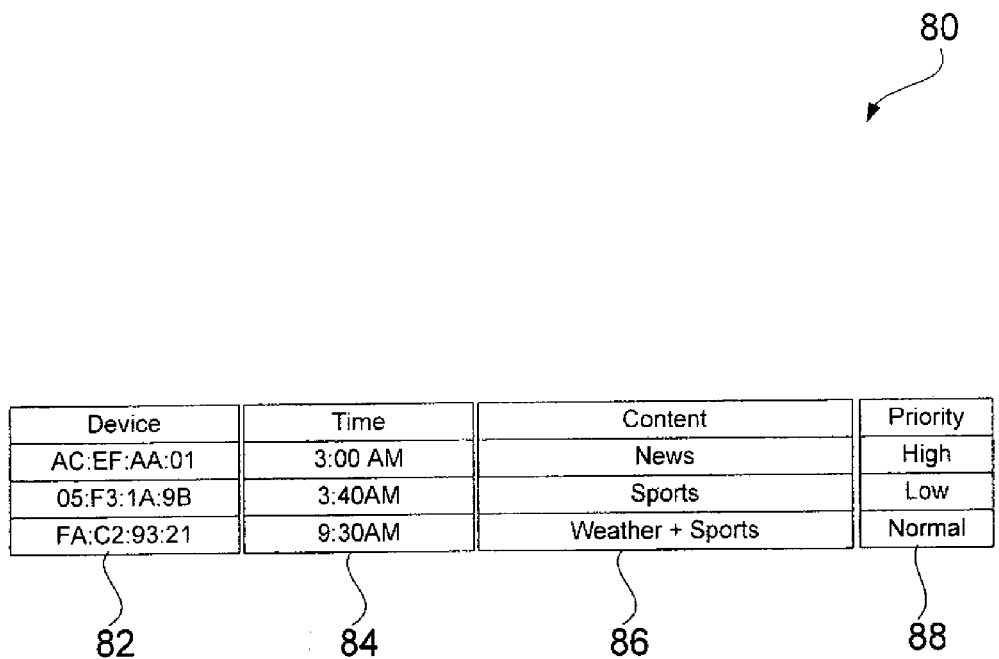
FIG. 4 illustrates a table used in pre-loading according to an embodiment of the disclosure.

FIG. 4 is an example of a table 80 that might be created by the data center 40 for use in determining the order of pre-loading. It is expressly understood that this table may be created by the data center 40 or the base transceiver station 12 by any number of methods, including, but not limited to, the type of content being requested or other information associated with the wireless device 30. This table includes four columns: a device column 82, a time column 84, a content column 86, and a priority column 88. This table illustrates how pre-loading can be ordered to allow for downloading based upon requested content and the priority of the requested content. Low priority content, such as information that is not considered to be emergency content, may be transmitted during non-peak times. Higher priority content, such as emergency weather information, or information that is specifically subscribed to as high priority content, may be transmitted during peak times. Through the use of ordering content to be transmitted to a wireless user, rich multimedia content may be delivered to a wireless user without degrading the network.

At the time indicated in FIG. 4 listed in the time column 84, the wireless device will be "woken up" and instructed to provide the status of the device to the data center 40. If the wireless device 30 is ready to accept content, the wireless device will be instructed to proceed and request content. It is expressly understood that the data center 40, in some embodiments, may be designated to only alert the wireless device 30 that it is time to obtain the content. In some embodiments, this may have the advantages of allowing the data center 40 to regulate bandwidth usage of the network. It is expressly understood that the content obtained by the wireless device 30 may or may not originate from or pass through the data center 40. The type of information obtained by the wireless device 30 is illustrated by the content column 86.

Figure 5:
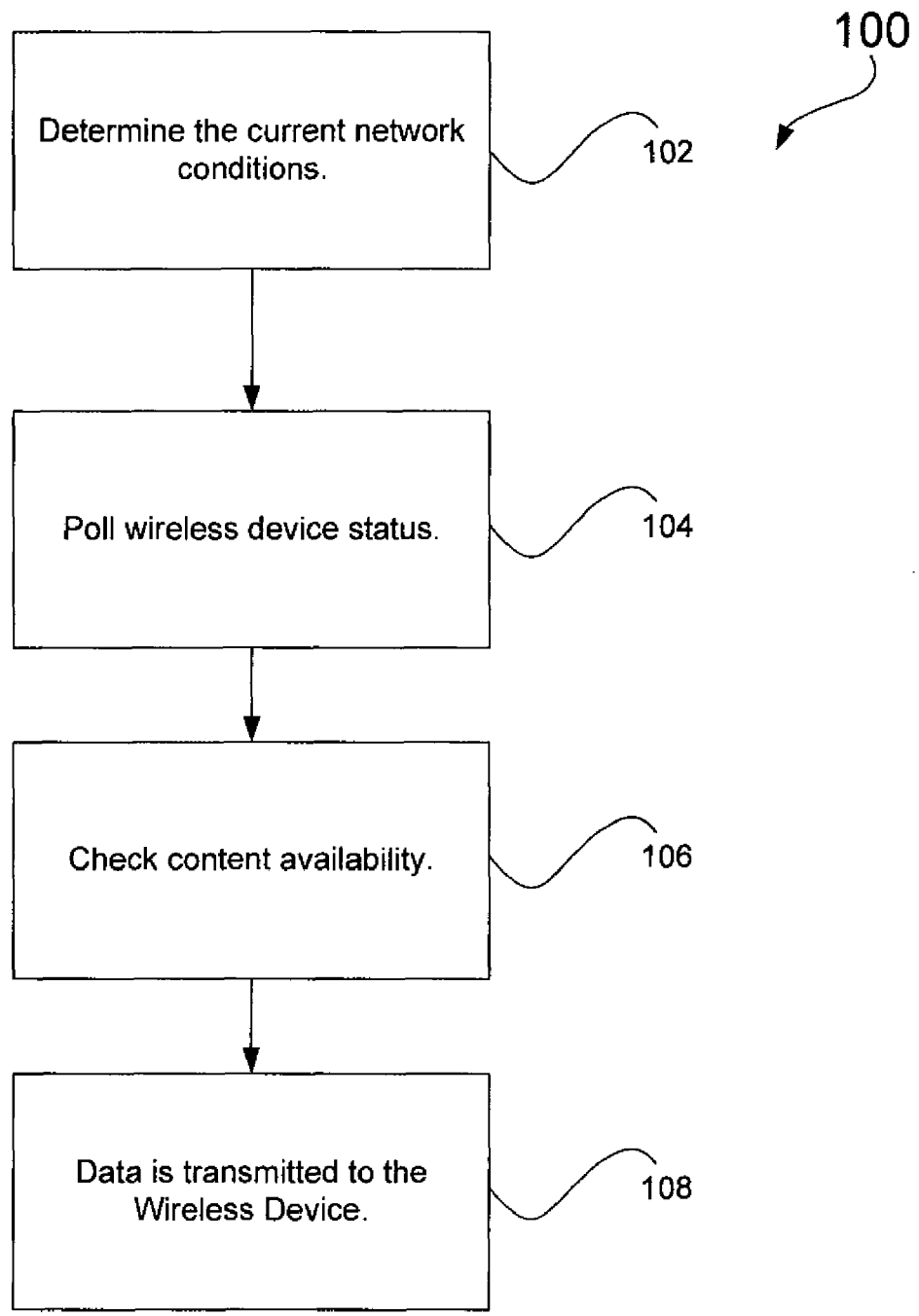
FIG. 5 illustrates a method of delivering content to a user according to an embodiment of the disclosure.

FIG. 5 is an exemplary method 100 of how to wake up, prepare, and transmit data to the wireless device 30. In block 102, the current network conditions are determined. Current network conditions may, in some embodiments, include the available bandwidth available in the network. In block 104 the status of the wireless device 30 is polled. Polling refers to the process by which information is obtained from the wireless device 30. The information obtained from the wireless device 30 may include information related to the location of the wireless device 30, the battery status of the wireless device 30, the signal strength of the wireless device 30, prior content accessed from the wireless device 30, or any other information that may be obtained from the wireless device 30. In block 106, the content is checked to make sure that it is available to be sent to the wireless device 30. In block 108, the content is sent to the wireless device 30.

As discussed above, the battery status and the signal strength or the bandwidth of the wireless communication channel of the wireless device 30 may be used to make a decision to forgo sending content to the wireless device 30 in block 108. Users generally do not like to find their wireless device 30 inoperable due to insufficient power because of automated applications. The determination that the battery status of the wireless device 30 is below about 30% capacity, about 25% capacity, about 20% capacity, or some other effective capacity, may be used to forgo sending content to the wireless device 30. The battery status may include information about a coupled to external power state, for example charging from an AC outlet. When coupled to external power, the battery reserve level may be ignored and the content sent to the wireless device 30. The signal strength or the bandwidth of the wireless communication channel may be employed similarly or cooperatively with the battery reserve status, because a poor signal strength and/or a low bandwidth of the wireless communication channel may cause the wireless device 30 to consume more power receiving the content than if a strong signal strength or high bandwidth wireless communication channel prevailed.

Pseudo-code that might be used to transmit data in one embodiment similar to the method illustrated by FIG. 5 might appear like:

```
sub (contact device)
When (time=scheduled pre-loading transmission)
Contact wireless device;
    If battery of wireless device=>acceptable level then
    If network available (check signal strength, location, available network resources at location) then
    Transmit content
    Else
    Error message
    Error message
End sub;
```

One of the issues that the disclosed systems and methods compensate for is the movement of a mobile device from first wireless coverage area 20. As illustrated by FIG. 1, the number of the wireless devices 30, 32, 34, 36, and 38 within the wireless coverage area 20, 22 of the base transceiver station 12, 14 may vary. Therefore, the available bandwidth to the wireless device 30 may vary depending on the location of the wireless device 30. By determining the location of the wireless device 30, the available bandwidth at the current location of the wireless device 30 may be determined, and the data network 10 may ensure that sufficient bandwidth exists at the current location for content delivery.

It is expressly understood that while the method of waking the wireless device 30 has been discussed in the "pull" sense (e.g., the wireless device requests content) it is also understood that the wireless device may have content "pushed" to it by the data center 40 or by one or more sources. Moreover, the wireless device 30, when woken, may be alerted that a feed which is transmitted over the wireless network in a general sense is available. For instance, the wireless device 30 may be directed to wake up when a generic news feed is transmitted over a WiMAX channel. In this way, the wireless device 30 can be programmed to wake up and "capture" a feed which is being transmitted, even though that feed is not being transmitted directly to the wireless device 30. In the example of the "capture" of a feed, the wireless device 30 may only record part of the wireless feed that corresponds to the preferences of the user with the wireless device 30.

Figure 6:
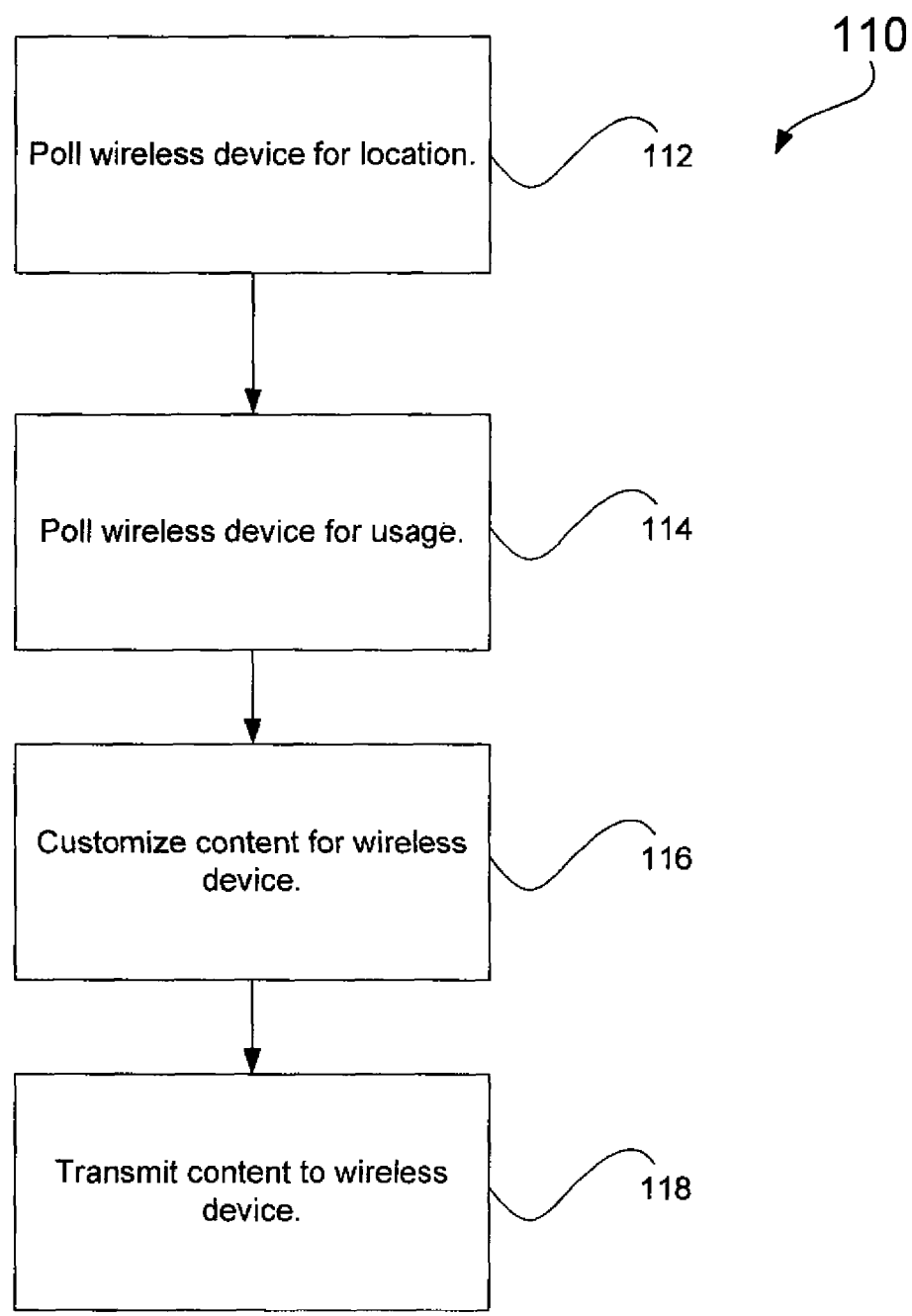
FIG. 6 illustrates a method of customizing content for a user according to an embodiment of the disclosure.

FIG. 6 illustrates a method 110 for using the information obtained by the polling discussed in the method disclosed by FIG. 5. Polling the wireless device 30 is one method of determining the wireless device 30 usage information. From this usage information, preferences may be determined. This may, in some embodiments, permit additional content to be transmitted to a user if sufficient resources existed at the current location of the wireless device 30. One example of this is that if a user is subscribed to sports information, and there is a significant amount of excess bandwidth, content encoded at a higher bandwidth (e.g. 450 kbps) may be transmitted rather than content at a lower bandwidth (e.g. 100 kbps). Moreover, the length of the clip may be altered based upon the location of the user and the user's preferences. The more bandwidth available to a user, the more content that may be delivered to the user. For instance, if there is a significant amount of bandwidth available, there may be a one minute clip transmitted, while if only a limited amount of bandwidth is available, only a 10 second clip may be downloaded.

As shown in block 112 of FIG. 6, the wireless device 30 is polled and the location of the wireless device 30 is determined. The wireless device 30 is then polled for usage in block 114. Usage information may include information (e.g. sports, news, etc.) the user has previously accessed. The usage information can also include content playback times and commute times inferred from a time sequence record of locations of the wireless device 30. Block 116 shows that the data center 40 can customize content for the user. In block 118 this content is then transmitted to the user.

Figure 7:
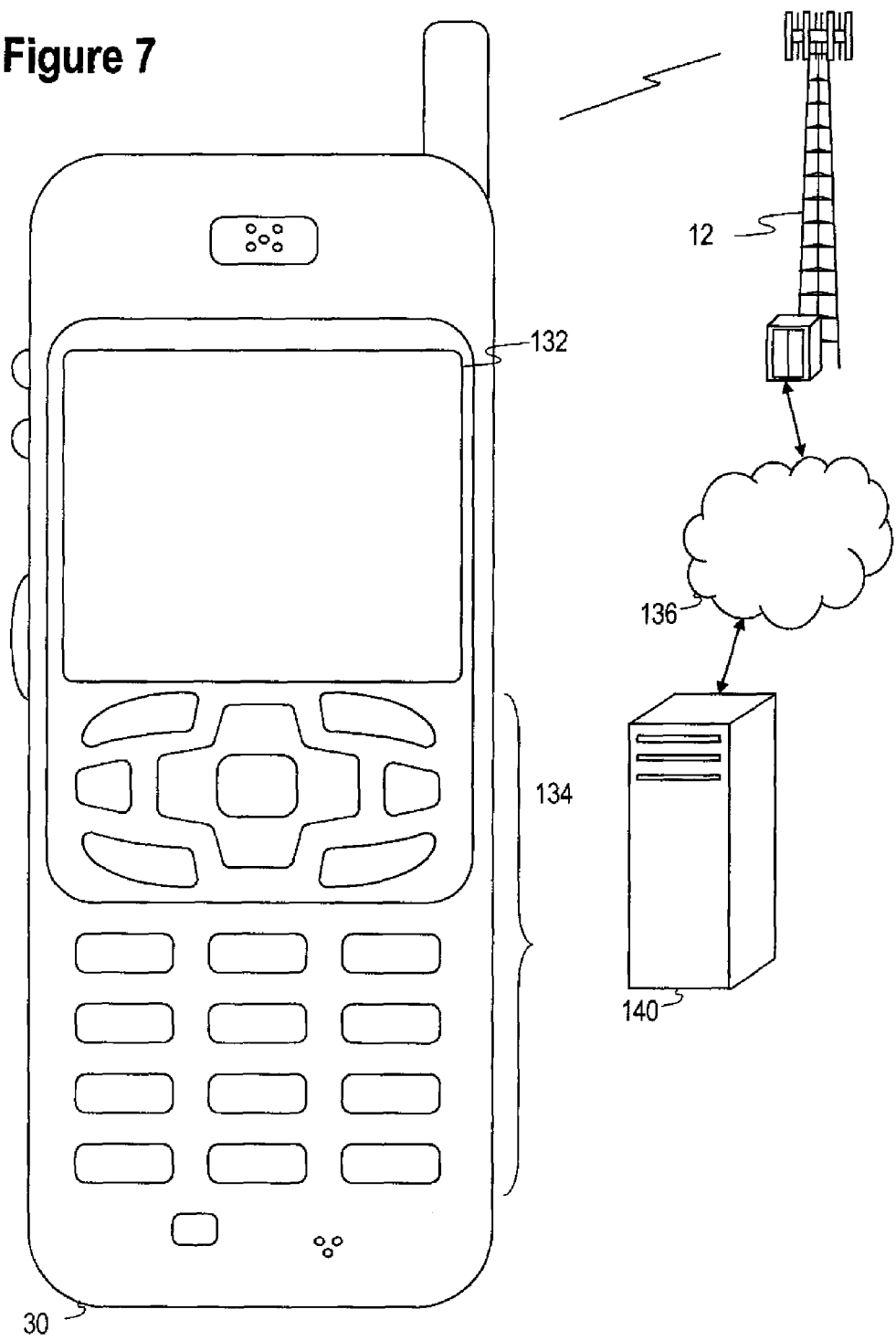
FIG. 7 illustrates an exemplary handset suitable for implementing the several embodiments of the disclosure.

FIG. 7 depicts the wireless device 30, which is operable for implementing aspects of the present disclosure, but the present disclosure should not be limited to these implementations. Though illustrated as a mobile phone, the wireless device 30 may take various forms including a wireless handset, a pager, a personal digital assistant (PDA), a portable computer, a tablet computer, or a laptop computer. Many suitable handsets combine some or all of these functions. In some embodiments of the present disclosure, the wireless device 30 is not a general purpose computing device like a portable, laptop or tablet computer, but rather is a special-purpose communications device such as a mobile phone, wireless handset, pager, or PDA. The wireless device 30 may support specialized activities such as gaming, inventory control, job control, and/or task management functions, and so on.

The wireless device 30 includes a screen 132 and a touch-sensitive surface or keys 134 for input by a user. The wireless device 30 may present options for the user to select, controls for the user to actuate, and/or cursors or other indicators for the user to direct. The wireless device 30 may further accept data entry from the user, including numbers to dial or various parameter values for configuring the operation of the handset. The wireless device 30 may further execute one or more software or firmware applications in response to user commands. These applications may configure the wireless device 30 to perform various customized functions in response to user interaction. Additionally, the wireless device 30 may be programmed and/or configured over-the-air, for example from a wireless base transceiver station, a wireless access point, or a peer wireless device 30.

The wireless device 30 may execute a web browser application which enables the screen 132 to show a web page. The web page may be obtained via wireless communications with a first base transceiver station 12, a wireless network access node, a peer handset or any other wireless communication network or system. The first base transceiver station 12 (or wireless network access node) is coupled to a wired network 136, such as the Internet. Via the wireless link and the wired network, the wireless device 30 has access to information on various servers, such as a server 140. The server 140 may provide content that may be shown on the screen 132. Alternately, the wireless device 30 may access the first base transceiver station 12 through the wireless device 30 acting as an intermediary, in a relay type or hop type of connection.

Figure 8:
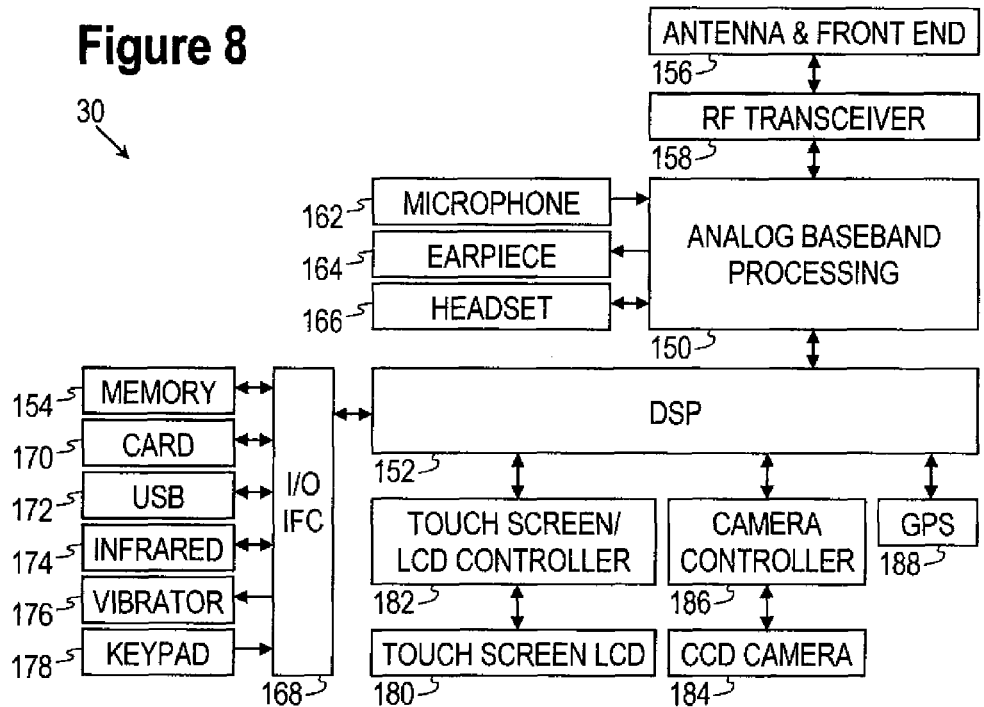
FIG. 8 is a block diagram of a handset suitable for implementing the several embodiments of the disclosure.

FIG. 8 shows a block diagram of the wireless device 30. While a variety of known components of wireless device 30 are depicted, in an embodiment a subset of the listed components and/or additional components not listed may be included in the wireless device 30. The wireless device 30 includes a digital signal processor (DSP) 152 and a memory 154. As shown, the wireless device 30 may further include an antenna and a front end unit 156, a radio frequency (RF) transceiver 158, an analog baseband processing unit 150, a microphone 162, an earpiece speaker 164, a headset port 166, an input/output interface 168, a removable memory card 170, a universal serial bus (USB) interface 172, an infrared port 174, a vibrator 176, a keypad 178, a touch screen liquid crystal display (LCD) with a touch sensitive surface screen 180, a touch screen/LCD controller 182, a charge-coupled device (CCD) camera 184, a camera controller 186, and a global positioning system (GPS) sensor 188. In an embodiment, the wireless device 30 may include another kind of display that does not provide a touch sensitive screen. In an embodiment, the DSP 152 may communicate directly with the memory 154 without passing through the input/output interface 168.

The DSP 152 or some other form of controller or central processing unit operates to control the various components of the wireless device 30 in accordance with embedded software or firmware stored in memory 154 or stored in memory contained within the DSP 152 itself. In addition to the embedded software or firmware, the DSP 152 may execute other applications stored in the memory 154 or made available via information carrier media such as portable data storage media like the removable memory card 170 or via wired or wireless network communications. The application software may comprise a compiled set of machine-readable instructions that configure the DSP 152 to provide the desired functionality, or the application software may be high-level software instructions to be processed by an interpreter or compiler to indirectly configure the DSP 152.

The antenna and front end unit 156 may be provided to convert between wireless signals and electrical signals, enabling the wireless device 30 to send and receive information from a cellular network or some other available wireless communications network or from a peer handset. In an embodiment, the antenna and front end unit 156 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 156 may include antenna tuning and/or impedance matching components, RF power amplifiers, and/or low noise amplifiers.

The RF transceiver 158 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 150 and/or the DSP 152 or other central processing unit. In some embodiments, the RF transceiver 158, portions of the antenna and front end unit 156, and the analog baseband processing unit 150 may be combined in one or more processing units and/or application specific integrated circuits (ASICs).

The analog baseband processing unit 150 may provide various analog processing of inputs and outputs, for example analog processing of inputs from the microphone 162 and the headset port 166 and outputs to the earpiece speaker 164 and the headset port 166. To that end, the analog baseband processing unit 150 may have ports for connecting to the built-in microphone 162 and the earpiece speaker 164 that enable the wireless device 30 to be used as a cell phone. The analog baseband processing unit 150 may further include a port for connecting to a headset or other hands-free microphone and speaker configuration. The analog baseband processing unit 150 may provide digital-to-analog conversion in one signal direction and analog-to-digital conversion in the opposing signal direction. In some embodiments, at least some of the functionality of the analog baseband processing unit 150 may be provided by digital processing components, for example by the DSP 152 or by other central processing units.

The DSP 152 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 152 may perform modulation, coding, interleaving, and spreading, and for a receiver function the DSP 152 may perform despreading, deinterleaving, decoding, and demodulation. In another embodiment, for example in an orthogonal frequency division multiplex access (OFDMA) technology application, for the transmitter function the DSP 152 may perform modulation, coding, interleaving, inverse fast Fourier transforming, and cyclic prefix appending, and for a receiver function the DSP 152 may perform cyclic prefix removal, fast Fourier transforming, deinterleaving, decoding, and demodulation. In other wireless technology applications, yet other signal processing functions and combinations of signal processing functions may be performed by the DSP 152.

The DSP 152 may communicate with a wireless network via the analog baseband processing unit 150. In some embodiments, the communication may provide Internet connectivity, enabling a user to gain access to content on the Internet and to send and receive e-mail or text messages. The input/output interface 168 interconnects the DSP 152 and various memories and interfaces. The memory 154 and the removable memory card 170 may provide software and data to configure the operation of the DSP 152. Among the interfaces may be the USB interface 172 and the infrared port 174. The USB interface 172 may enable the wireless device 30 to function as a peripheral device to exchange information with a personal computer or other computer system. The infrared port 174 and other optional ports such as a Bluetooth interface or an IEEE 802.11 compliant wireless interface may enable the wireless device 30 to communicate wirelessly with other nearby handsets and/or wireless base transceiver stations.

The input/output interface 168 may further connect the DSP 152 to the vibrator 176 that, when triggered, causes the wireless device 30 to vibrate. The vibrator 176 may serve as a mechanism for silently alerting the user to any of various events such as an incoming call, a new text message, and an appointment reminder.

The keypad 178 couples to the DSP 152 via the input/output interface 168 to provide one mechanism for the user to make selections, enter information, and otherwise provide input to the wireless device 30. Another input mechanism may be the touch LCD screen 180, which may also display text and/or graphics to the user. The touch screen LCD controller 182 couples the DSP 152 to the touch LCD screen 180.

The CCD camera 184 enables the wireless device 30 to take digital pictures. The DSP 152 communicates with the CCD camera 184 via the camera controller 186. The GPS sensor 188 is coupled to the DSP 152 to decode global positioning system signals, thereby enabling the wireless device 30 to determine its position. In another embodiment, a camera operating according to a technology other than Charge Coupled Device cameras may be employed. Various other peripherals may also be included to provide additional functions, e.g., radio and television reception.

Figure 9:
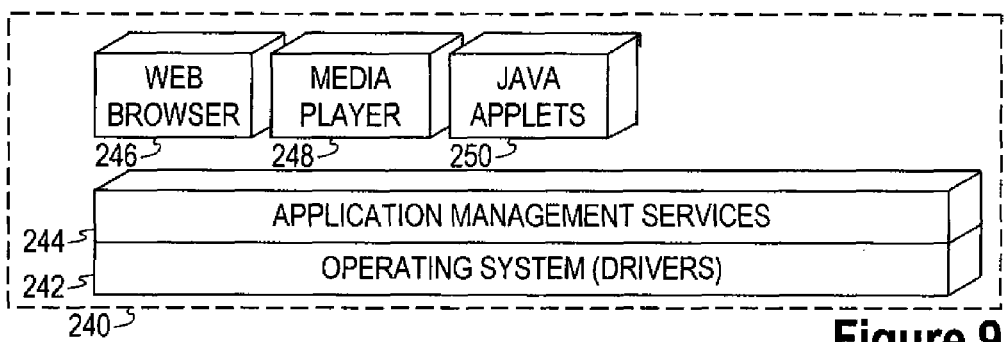
FIG. 9 illustrates a software environment that may be implemented by the handset.

FIG. 9 illustrates a software environment 240 that may be implemented by the DSP 152. The DSP 152 executes operating system drivers 242 that provide a platform from which the rest of the software operates. The operating system drivers 242 provide drivers for the handset hardware with standardized interfaces that are accessible to application software. The operating system drivers 242 include application management services ("AMS") 244 that transfer control between applications running on the wireless device 30. Also shown in FIG. 9 are a web browser application 246, a media player application 248, and JAVA applets 250. The web browser application 246 configures the wireless device 30 to operate as a web browser, allowing a user to enter information into forms and select links to retrieve and view web pages. The media player application 248 configures the wireless device 30 to retrieve and play audio or audiovisual media. The JAVA applets 250 configure the wireless device 30 to provide games, utilities, and other functionality.

Figure 10:
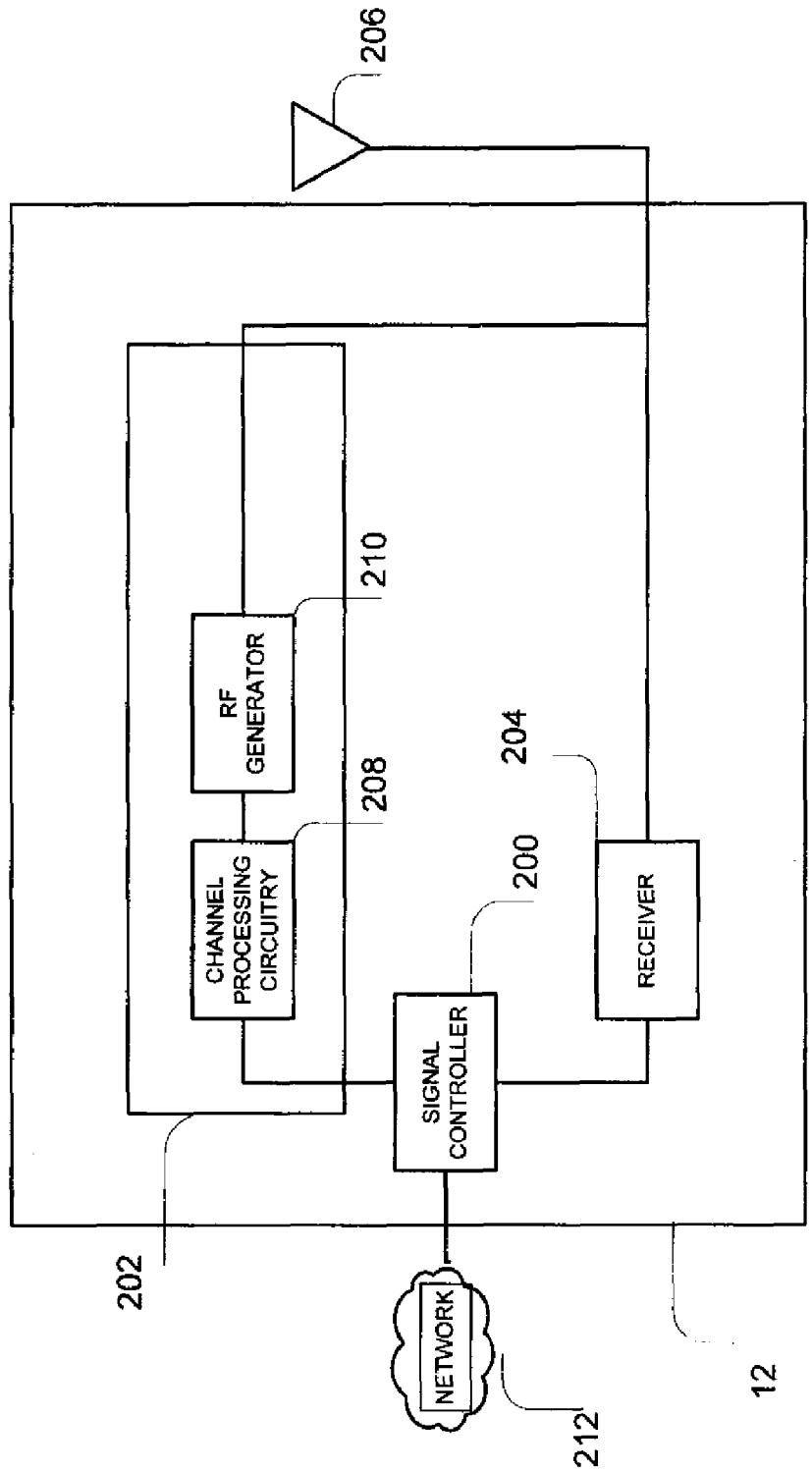
FIG. 10 is a block diagram of a base transceiver station according to an embodiment of the disclosure.

FIG. 10 illustrates one embodiment of the first base transceiver station 12 embodied as a base transceiver station that can be used with the disclosed systems. In this embodiment, the first base transceiver station 12 is a medium to high-power multi-channel, two-way radio in a fixed location. Typically the first base transceiver station 12 may be used by low-power, single-channel, two-way radios or wireless devices such as mobile phones, portable phones and wireless routers. The first base transceiver station 12 may comprise a signal controller 200 that is coupled to a transmitter 202 and a receiver 204. The transmitter 202 and the receiver 204 (or combined transceiver) are further coupled to an antenna 206. In the first base transceiver station 12, digital signals are processed in the signal controller 200. The digital signals may be signals for a wireless communication system, such as signals that convey voice or data intended for a mobile terminal (not shown). First base transceiver station 12 may employ any suitable wireless technologies or standards including, but not limited to, 2G, 2.5G, 3G, GSM, IMT-2000, UMTS, iDEN, GPRS, 1xEV-DO, EDGE, DECT, PDC, TDMA, FDMA, CDMA, W-CDMA, LTE, TD-CDMA, TD-SCDMA, GMSK, OFDM, WiMAX, the family of IEEE 802.11 standards, the family of IEEE 802.16 standards, IEEE 802.20, etc. Signal controller 200 then transmits the digital signals to transmitter 202, which includes a channel processing circuitry 208. Channel processing circuitry 208 encodes each digital signal, and a radio frequency (RF) generator 210 modulates the encoded signals onto an RF signal. The resulting output signal is transmitted over antenna 206 to the mobile terminal. Antenna 206 also receives signals sent to first base transceiver station 12 from the mobile terminal. Antenna 206 transmits the received signals to receiver 204 that demodulates them into digital signals and transmits the received signals to signal controller 200 where they may be relayed to an external network 212. First base transceiver station 12 may also comprise auxiliary equipment such as cooling fans or air exchangers for the removal of heat from first base transceiver station 12.

Figure 11:
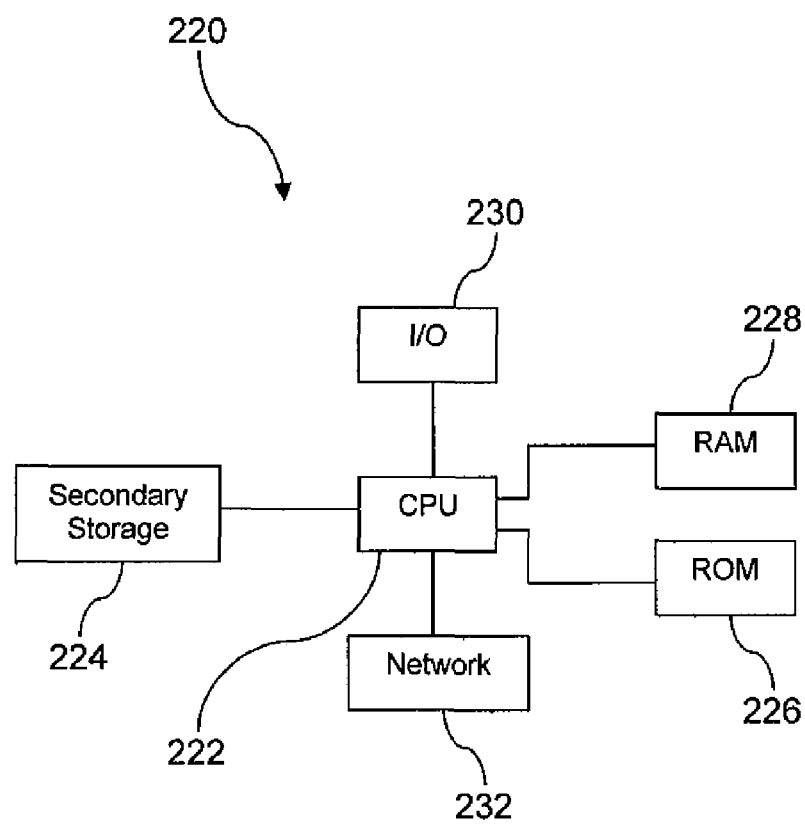
FIG. 11 illustrates an exemplary general purpose computer system suitable for implementing the several embodiments of the disclosure.

Portions of the system described above, for example the data center 40, may be implemented on any general-purpose computer with sufficient processing power, memory resources, and network throughput capability to handle the necessary workload placed upon it. FIG. 11 illustrates a typical, general-purpose computer system suitable for implementing one or more embodiments disclosed herein. The computer system 220 includes a processor 222 (which may be referred to as a central processor unit or CPU) that is in communication with memory devices including secondary storage 224, read only memory (ROM) 226, random access memory (RAM) 228, input/output (I/O) devices 230, and network connectivity devices 232. The processor may be implemented as one or more CPU chips.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. The ROM 226 is used to store instructions and perhaps data which are read during program execution. ROM 226 is a non-volatile memory device which typically has a small memory capacity relative to the larger memory capacity of secondary storage. The RAM 228 is used to store volatile data and perhaps to store instructions. Access to both ROM 226 and RAM 228 is typically faster than to secondary storage 224.

I/O devices 230 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) global system for mobile communications (GSM), and/or worldwide interoperability for microwave access (WiMAX) radio transceiver cards, and other well-known network devices. These network connectivity device 232 may enable the processor 222 to communicate with an Internet or one or more intranets. With such a network connection, it is contemplated that the processor 222 might receive information from the network, or might output information to the network in the course of performing the above-described method steps. Such information, which is often represented as a sequence of instructions to be executed using processor 222, may be received from and outputted to the network, for example, in the form of a computer data signal embodied in a carrier wave.

Such information, which may include data or instructions to be executed using processor 222 for example, may be received from and outputted to the network, for example, in the form of a computer data baseband signal or signal embodied in a carrier wave. The baseband signal or signal embodied in the carrier wave generated by the network connectivity devices 232 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 222 executes instructions, codes, computer programs, scripts which it accesses from hard disk, floppy disk, optical disk (these various disk based systems may all be considered secondary storage 224), ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of transmitting multimedia data, comprising:
   polling a first wireless device to obtain at least a first statistics of consumption of content previously transmitted to the first wireless device;
   polling a second wireless device to obtain at least a second statistics of consumption of content previously transmitted to the second wireless device;
   determining the resources available to transmit a first content and a second content to the first and second wireless device, wherein the first content to be transmitted to the first wireless device is selected based on the first statistics of consumption, and wherein the second content to be transmitted to the second wireless device is selected based on the second statistics of consumption;
   creating a priority list based on the first statistics of consumption and the second statistics of consumption, wherein the priority list comprises the first wireless device and the first content and the second wireless device and the second content; and
   transmitting the first content to the first wireless device and the second content to the second wireless device according to the priority list and according to the resources available.

2. The method of claim 1, wherein the resources available comprise the available network bandwidth to transmit data.

3. The method of claim 2, wherein the resources available are determined based on historical network data.

4. The method of claim 1, wherein the priority list is based on a type of content, a subscriber of the content, and a time the content is consumed.

5. The method of claim 1, wherein the polling the first wireless device includes obtaining a power supply status of the first wireless device and the polling the second wireless device includes obtaining a power supply status of the second wireless device.

6. The method of claim 5, wherein when the first device power supply status does not indicate the first device is connected to an external source of power and the battery power reserve is less than a first predefined threshold, the first content is not transmitted to the first wireless device.

7. The method of claim 6, wherein when the first device power supply status does not indicate the first device is connected to an external source of power and the battery power reserve is less than a second predefined threshold, wherein the second predefined threshold is higher than the first predefined threshold, and when a radio channel associated with the first wireless device has a bandwidth less than a third predefined threshold, the first content is not transmitted to the first wireless device.

8. The method of claim 1, wherein the content is multimedia content.

9. The method of claim 1, wherein the content is transmitted to the wireless device using a wireless network that uses a technology selected from the group of WiFi, WiMAX, CDMA, TDMA, EDGE, and GSM.

10. The method of claim 1, wherein the content is transmitted to the wireless device using a wireless network and wherein the available network resources include estimates as to a total number of wireless devices being served by a base transceiver station.

11. The method of claim 1, wherein the first statistics of consumption of content and the second statistics of consumption of content include the length of content used by the user, the type of content used by the user, and the time of day the content is used by the user.

12. A system for prioritizing the transmission of wireless data, the system comprising:
   a data server content component, wherein the data server content component receives content;
   a transmission component to transmit the content to an at least one wireless device;
   a network statistic component to determine the current status of the network including a number of wireless devices in the coverage area of the transmission component and an available bandwidth; and
   a network prioritization component that polls the at least one wireless device to determine a history of usage of a previously transmitted content and to determine a current power status of the at least one wireless device and when the current power status of the at least one wireless device is at least one of connected to external power or battery power reserve above a predefined threshold promotes transmission of the content by the transmission component.

13. The system of claim 12, wherein the network prioritization component orders the transmission of the content based on the time the at least one wireless device will use the content, the current status of the network, the available bandwidth of the network, and the type of content requested by the wireless device.

14. The system of claim 13, further comprising a wireless feedback component, wherein the wireless feedback component accepts usage information from the at least one wireless device and transmits the usage information from the at least one wireless device to the network prioritization component.

15. The system of claim 12, wherein the content is multimedia content.

16. The system of claim 12, wherein the transmission component transmits content using a wireless network.

17. A method of transmitting data to a wireless device, comprising:
   determining a plurality of non-peak traffic times for a wireless network;
   transmitting a first message to a wireless device over the wireless network during one of the non-peak traffic times;
   a wireless device transmitting statistics about playback of previously downloaded content on the wireless device, where the transmitting is in response to the message transmitted to the wireless device;
   preparing a package of content selected for the wireless device based on the statistics;
   transmitting a second message to the wireless device at a time selected based on a prioritization of content distribution to a plurality of wireless devices; and
   the wireless device requesting transmission of the package of content to the wireless device, where the requesting is in response to the second message transmitted to the wireless device.

18. The method of claim 17, wherein the wireless device further transmits at least one of a connected to external power condition, a battery state, a location of the wireless device, and a signal strength along with the statistics.

19. The method of claim 18, wherein when the wireless device transmits an indication that the wireless device is not in the connected to external power condition and an indication that the battery state is below a predefined threshold, the second message is not transmitted.

20. The method of claim 17, wherein the first and second messages are transmitted through at least one base transceiver station and wherein the base transceiver station uses technology comprising one of GMS, WiMAX, UTMS, CDMA, EDGE, and TDMA.

* * * * *